(12) United States Patent
Kato

(10) Patent No.: US 7,364,292 B2
(45) Date of Patent: Apr. 29, 2008

(54) METHOD OF DESIGNING PROGRESSIVE POWER LENS GROUP

(75) Inventor: Kazutoshi Kato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 11/370,928

(22) Filed: Mar. 9, 2006

(65) Prior Publication Data

US 2006/0203193 A1 Sep. 14, 2006

(30) Foreign Application Priority Data

| Mar. 9, 2005 | (JP) | ............................. 2005-064999 |
| Dec. 22, 2005 | (JP) | ............................. 2005-369182 |

(51) Int. Cl.
*G02C 7/06* (2006.01)
(52) U.S. Cl. ...................................... 351/169; 351/177
(58) Field of Classification Search ................ 351/169, 351/177
See application file for complete search history.

(56) References Cited

U.S. PATENT DOCUMENTS

| 5,272,495 A | 12/1993 | Pedrono |
| 5,710,615 A * | 1/1998 | Kitani ......................... 351/169 |
| 5,784,144 A | 7/1998 | Kelch et al. |
| 5,861,935 A | 1/1999 | Morris et al. |
| 6,652,097 B2 * | 11/2003 | Shirayanagi ................. 351/169 |

FOREIGN PATENT DOCUMENTS

| EP | 2003329984 | 11/2003 |
| JP | 2001-4963 A | 1/2001 |
| JP | 2001-51241 A | 2/2001 |
| JP | 2002-311396 A | 10/2002 |
| JP | 2003-131175 A | 5/2003 |
| JP | 2003-131176 A | 5/2003 |
| JP | 2003-329984 A | 11/2003 |

* cited by examiner

*Primary Examiner*—Scott J. Sugarman
(74) *Attorney, Agent, or Firm*—Sughrue Mion, PLLC

(57) ABSTRACT

A method of designing a progressive power lens group as a set of progressive power lenses, each having a first refractive section having a refractive power for seeing an object located at a predetermined distance, a second refractive section having a refractive power for seeing an object located at a near distance, and a progressive section with its refractive power progressively changing from the first refractive section to the second refractive section, the progressive power lens group satisfying: a condition where the first refractive sections differing in refractive power can be selected; a condition where at least two additions can be selected for the first refractive section having an identical refractive power; a condition where refractive indexes of materials of the progressive power lenses are identical; and a condition where design concepts of the progressive power lenses are standardized, the method includes designing the progressive power lenses so that for the progressive power tenses identical in addition, the smaller the refractive power of the first refractive section is, the shorter a distance in a vertical direction between a fitting point and a refractive power measurement point of the second refractive section is, and for the progressive power lenses identical in the refractive power of the first refractive section, the larger the addition is, the longer the direction in the vertical direction between the fitting point and the refractive power measurement point of the second refractive section is.

3 Claims, 5 Drawing Sheets

METHOD OF DESIGNING PROGRESSIVE POWER LENS GROUP

BACKGROUND

1. Technical Field

The present invention relates to a method of designing a progressive power lens group as a set of progressive power lenses for covering an insufficiency of ability of accommodation owing to presbyopia, in which the grouped progressive power lenses are based on the same design concept.

2. Related Art

A progressive power lens has: a far-distance use section in its upper portion for seeing in a relatively long range; a near-distance use section in its lower portion for seeing in a relatively short range; and a progressive section located in the middle of the far-distance use section and the near-distance use section and having a gradually changed refractive power. In general, the distance between the far-distance use section and the near-distance use section, namely the length of the progressive section, is referred to as progressive zone length. In a progressive power lens, because the boundary of the far-distance use section and the near-distance use section is not located on the lens, it is difficult to determine the size of the progressive zone length from the lens. However, in the description hereof, a portion of transition from a region where the refractive power is substantially constant to a region where the refractive power changes between the far-distance use section and the progressive section on a major meridian, is defined as a far-distance use section lower end. And a transitional portion from the changing refractive power region to a near-distance use region where the refractive power region is substantially constant between the progressive section and the near-distance use section, is defined as a near-distance use section upper end. The distance between the far-distance use section lower end and the near-distance use section upper end shall be referred to as "progressive zone length."

As shown in FIG. 2, a progressive power lens 10, which is delivered to a distributor, has a layout print used in fitting an eyeglass into an eyeglass frame, a fitting point F, a refractive power reference circle for measurements of a far-distance use refractive power and an addition, etc. printed thereon using an erasable ink. The center of the far-distance use refractive power reference circle 1 is referred to as far-distance use refractive power measurement point Dp, and the center of the addition's reference circle 2 is referred to as near-distance use refractive power measurement point Np. In general, the fitting point F is provided at a transition point between the far-distance use section and the progressive section, and the upper end of the addition's reference circle 2 is substantially coincident with the near-distance use section upper end, which somewhat differs from eyeglass manufacturer to manufacturer. On this account, the distance from the fitting point F to the upper end of the addition's reference circle 2 in a vertical direction can be simply regarded as a progressive zone length.

It is common that the region for the near-distance use section is provided in a peripheral portion located out of a center portion of a lens. In the peripheral portion of a lens, a very large prism refractive power arises under the influence of the far-distance use refractive power and addition of the lens. A group of progressive power lenses, in which the lenses are standardized and designed under a certain design concept so that base elements as a progressive power lens has, such as a far-distance use clear-vision region width and a near-distance use clear-vision region width, accomplish a common wearing purpose, is provided to consumers, for example, under the same trade name. The progressive zone length of each progressive power lens of a group of progressive power lenses having the same trade name is constant. In other words, the location of the near-distance use section is fixed regardless of the value of the far-distance use refractive power.

Incidentally, for example, as shown in JP-A-2003-329984, there has been the idea of changing the amount of biasing the near-distance use section toward the center depending on the prism effect of the near-distance use section previously. However, this is arranged so that left and right sight lines when a user sees with both eyes overlap properly. Also, prior to JP-A-2003-329984, inventions concerning the layout print which can cope with the change in location of the near-distance use section have been disclosed in e.g. JP-A-2001-51241, JP-A-2002-311396, JP-A-2003-131175, and JP-A-2003-131176. However, in any of them only the displacement corresponding to the near-distance use biasing toward the center is stated.

However, the prism amount at the near-distance use refractive power measurement point Np is changed depending on the far-distance use refractive power and the addition and as such, the location of an object point when the object is seen through the near-distance use refractive power measurement point Np is changed depending to the refractive power. For example, with a concave lens having a minus refractive power, the location of an object point differs between the sight line L1 heading for a rotation center O of an eyeball when an object is seen through the concave lens 11 shown by a solid line, having a relatively plus refractive power in near-distance use section refractive power and the sight line L2 heading for a rotation center O of an eyeball of the progressive power lens 12 shown by a broken line, having a relatively minus refractive power in near-distance use section refractive power, as shown in FIG. 3A. Therefore, in order to see a particular object with such concave lenses differing in refractive power, it is needed to change a wearing angle of the lens thereby to make the locations at which the object point is seen coincide, as shown in FIG. 3B. For example, to make the location of an object point of the progressive power lens 12 having a relatively minus refractive power in near-distance use section refractive power coincide with that of the concave lens 11 having a relatively plus refractive power in the near-distance use section refractive power, the progressive power lens 12 having a relatively minus refractive power in the near-distance use section refractive power has to be turned up somewhat to see an object point through the near-distance use refractive power measurement point Np.

This applies to a convex lens having a plus refractive power, too. As shown in FIG. 4A, the location of an object point differs between the sight line L3 shown by a solid line when an object is seen through the convex lens 21 shown by a solid line, having a relatively plus refractive power in the near-distance use section refractive power and the sight line L4 shown by a broken line through the progressive power lens 22 shown by a broken line, having a relatively minus refractive power in the near-distance use section refractive power. Therefore, in order to see a particular object with such convex lenses differing in refractive power, it is needed to change a wearing angle of the lens thereby to make the locations at which the object point is seen coincide, as shown in FIG. 4B. In either case, as for lenses for spectacles, it is required to turn the user's face up and down thereby to enable seeing an object through the near-distance use refractive power measurement point Np.

As described above, a progressive power lens has a portion to see in near-distance range located in a peripheral portion of the lens where the prism refractive power becomes larger, and a user has to change the tilting angle of his or her head depending on the refractive power of the lens to see. As a result, immediately after a lens is replaced with a new one of a group of progressive power lenses having the same trade name, the user would feel that the lens is bothersome and inconvenient until the user becomes used to the new lens.

SUMMARY

An advantage of some aspects of the invention is to provide a method of designing a progressive power lens group, by which even when in a group of progressive power lenses identical in refractive power of the material and standardized under the same design concept, a lens is replaced with another lens differing in refractive power from the previous one, an object can be seen with the same posture as that of the previous lens.

To achieve the above advantage, the invention provides fist a method of designing a progressive power lens group as a set of progressive power lenses, each having a first refractive section having a refractive power for seeing an object located at a predetermined distance, a second refractive section having a refractive power for seeing an object located at a near distance, and a progressive section with its refractive power progressively changing from the first refractive section to the second refractive section, the progressive power lens group satisfying: a condition where the first refractive sections differing in refractive power can be selected; a condition where at least two additions can be selected for the first refractive section having an identical refractive power; a condition where refractive indexes of materials of the progressive power lenses are identical; and a condition where design concepts of the progressive power lenses are standardized. And the method includes designing the progressive power lenses so that for the progressive power lenses identical in addition, the smaller the refractive power of the first refractive section is, the shorter a distance in a vertical direction between a fitting point and a refractive power measurement point of the second refractive section is, and for the progressive power lenses identical in the refractive power of the first refractive section, the larger the addition is, the longer the direction in the vertical direction between the fitting point and the refractive power measurement point of the second refractive section is.

A group of progressive power lenses sold under the same trade name includes two ore more progressive power lenses identical in the refractive index of the material and standardized under the same design concept. Further, among two or more progressive power lenses differing in refractive power of the far-distance use section or the first refractive section located in an upper portion of the lens to see an object at a middle distance, the first refractive section refractive power suitable for a user can be selected. In addition, a different addition can be selected for the same first refractive section refractive power. Conventionally, the progressive zone length of the progressive power lenses included in one progressive power lens group is fixed.

However, the inventor obtained the knowledge that even when the previous lens is replaced with a progressive power lens with a different refractive power from the previous lens, an object can be seen with the same posture as that of the previous lens by changing the location of the second refractive section up and down so that the prism refractive power at the refractive power measurement point of the second refractive section for seeing an object located at a near distance is made constant. In order to make constant the prism refractive power at the refractive power measurement point of the second refractive section, in the step of comparing two lenses of the same progressive power lens group under the condition where the two lenses are identical in addition, the lens smaller in the refractive power of the far-distance use section or the first refractive section located in an upper portion of the lens for seeing an object at a middle distance, i.e. the lens having a negatively larger refractive power shall be compared with the lens larger in the refractive power of the first refractive section, i.e. the lens having a positively larger refractive power. Then, the upper end of the second refractive section is disposed further above. This is because a peripheral portion of the lens is thicker and the prism refractive power is made larger in the second refractive section located in such lens peripheral portion for seeing an object at a near distance. As a result, the progressive zone length is shortened, whereby the prism refractive power at the refractive power measurement point of the second refractive section can be made constant. Also, in the step of comparing two lenses of the same progressive power lens group under the condition where the two lenses are identical in the refractive power of the first refractive section, the upper end of the second refractive section is disposed further below. This is because a lens larger in addition has a plus refractive power of the second refractive section in comparison to a lens having a smaller addition and therefore the prism refractive power is made smaller. As a result, the progressive zone length is made longer, whereby the prism refraction power at the refractive power measurement point of the second refractive section can be made constant.

Incidentally, it is difficult to determine the size of the progressive zone length from the lens and as such, the progressive zone length can be substantially expressed by the distance in the vertical direction between the fitting point and the refractive power measurement point of the second refractive section, both are easy to measure actually.

Second, the invention provides the first method of designing a progressive power lens group, further including designing the progressive power lenses when an astigmatism refractive power at a refractive power measurement point of the first refractive section is not zero so that for the progressive power lenses identical in the addition and the refractive power of the first refractive section, the progressive power lens smaller in a vertical direction component of the astigmatism refractive power of the refractive power of the first refractive section has a shorter distance in the vertical direction between the fitting point and the refractive power measurement point of the second refractive section.

When a refractive surface for correcting astigmatism such as a cylindrical refractive surface or a toric surface is provided, such refractive surface produces the prism refractive power. When lenses identical in addition and refractive power of the first refractive section, among a group of progressive power lenses are compared, a lens smaller in refractive power of a component of a vertical direction of an astigmatism refractive power, i.e. a lens having a negatively larger refractive power, has a larger prism refractive power in a base direction. Therefore, the upper end of the second refractive section is disposed further above, and the progressive zone length is shortened consequently. Thus, the prism refractive power at the refractive power measurement point of the second refractive section can be kept constant in the lens group.

Third, the invention provides the first method of designing a progressive power lens group, wherein the distance in the vertical direction between the fitting point and the refractive power measurement point of the second refractive section is a distance in the vertical direction on a major meridian between a location of transition from a region where the refractive power of the first refractive section is substantially constant to a region where the refractive power changes and a transitional location from the refractive power changing region to a near-distance use region with the refractive power substantially fixed between the progressive section and the second refractive section.

When the actual progressive zone length of a lens can be decided, the need for using a distance simply regarded as a progressive zone length is eliminated.

BRIEF DESCRIPTION OF THE DRAWINGS

The invention will be described with reference to the accompanying drawings, wherein like numbers reference like elements.

FIG. 3A shows a sight line when the location of the lens is not changed, and FIG. 3B shows a sight line when the lens is tilted.

FIG. 4A shows a sight line when the location of the lens is not changed, and FIG. 4B shows a sight line when the lens is tilted.

DESCRIPTION OF EXEMPLARY EMBODIMENTS

An embodiment of a method of designing a group of progressive power lenses in association with the invention will be described below. However, the invention is not limited to the following embodiment.

The method of designing a group of progressive power lenses in association with the invention is a method of designing each progressive power lens of a progressive power lens group. The progressive power lens group is a set of progressive power lenses provided to consumers under the same trade name and the grouped progressive power lenses are standardized in their design concept so that base elements as a progressive power lens has, such as a far-distance use clear-vision region width and a near-distance use clear-vision region width, accomplish a common wearing purpose.

Figure 2:
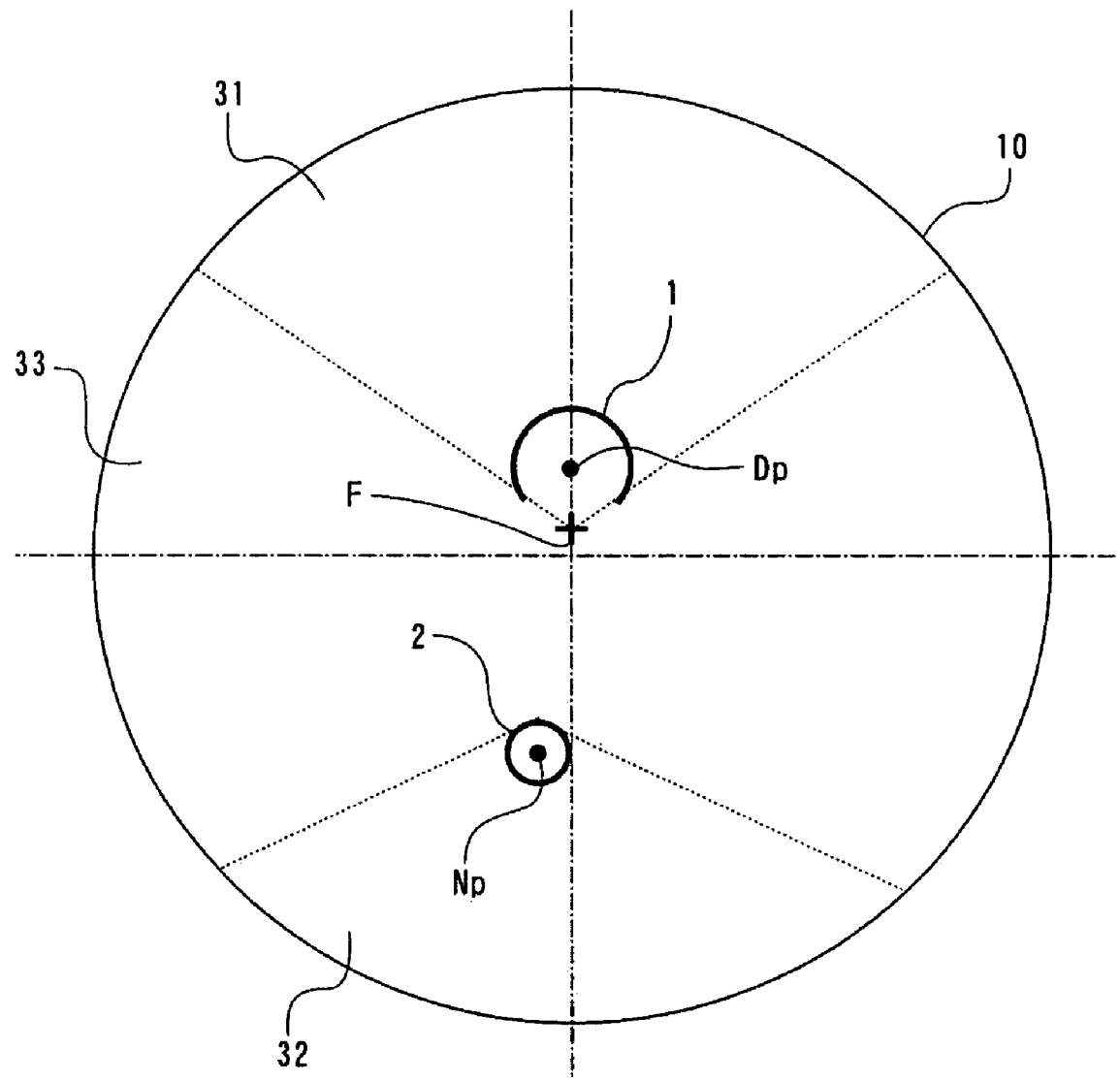
FIG. 2 is a plan view showing a layout of the progressive power lens.

A progressive power lens is primarily used as a lens for vision correction for a presbyopic person whose ability of accommodation has weakened. As shown in FIG. 2, the progressive power lens has: a first refractive section 31 in its upper portion, which has a refractive power required to see an object in the distance or in the middle distance through a lens; a second refractive section 32 in its lower portion, which has a refractive power required to see an object at a short distance; a progressive section 33 having a successively changing refractive power between the first refractive section 31 and the second refractive section 32. The progressive power lens has no boundary and therefore it is superior in fashion sense.

There are many design types of the progressive power lens, which includes the design types according to application, for example. A so-called far-and-near distance type progressive power lens has a far-distance use section in an upper portion of the lens for seeing an object at a long distance; a near-distance use section in a lower portion of the lens for seeing an object at a short distance; and a progressive section having a refractive power progressively changing between an upper progressive-change start point and a lower progressive-change end point. Such progressive power lens is designed based on a thought to make easier for eyes to circle when a user sees in a short range, in which both the far-distance use section and the near-distance use section are disposed so as to be balanced well and the progressive zone length is made 10 to 16 mm approximately. In general, the fitting point coincides with the far-distance use center, i.e. progressive-change start point. A so-called middle-distance type progressive power lens has: a far-distance use section in an upper end portion of the lens for seeing an object at a long distance; a near-distance use section of a relatively wide area in a lower portion of the lens for seeing an object at a short distance; and a progressive section located between the far-distance use section and the near-distance use section and having a progressively changing refractive power. The progressive zone length is designed so as to be rather long, about 19 to 25 mm, for the purpose of achieving a wide field of view when a user sees in a middle range. In general, the fitting point is located in the progressive section for seeing an object at a distance of about 1 m. A so-called near-distance type progressive power lens has: a middle section in an upper portion of the lens for seeing an object at a middle distance; a near-distance use section of a relatively wide area in a lower portion of the lens for seeing an object at a short distance; and a progressive section located between the middle section and the near-distance use section and having a progressively changing refractive power. The progressive zone length is designed so as to be rather long, about 19 to 25 mm, for the purpose of achieving a wide field of view when a user sees in a middle range. In addition, as for the design of distributions of distortion and astigmatism, progressive power lenses can be broadly classified into a concentrated-aberration type in which the far-distance use section and the near-distance use section are made wider to concentrate aberration on the narrow progressive section, and a dispersed-aberration type in which the far-distance use section and the near-distance use section are made narrower and the progressive section is widen, thereby to spread the aberration in the middle section.

The lenses of a progressive power lens group, a set of many progressive power lenses developed under the same trade name are identical in the refractive index of the lens material and standardized in their design concept concerning the described design type according to application as described above, the distribution of aberration, the change in refractive power of the progressive section, the clear-vision region width of the first refractive section, and the clear-vision region width of the second refractive section, whether the progressive refraction face is located on the side of an object (on the outer face side) or on the side of eyeballs (on the inner face side), etc. The group of progressive power lenses is designed so that the progressive power lenses constituting the progressive power lens group accomplish a common wearing purpose.

The progressive zone length is an important design item which decides the design concept of a progressive power lens. Therefore, it is typical that in the same progressive power lens group, every progressive power lens is identical in the progressive zone length.

However, in the case where eyes of a user becomes worse and, among grouped progressive power lenses identical in progressive zone length belonging to the same progressive power lens group, a second progressive power lens of a different degree (refractive power) is purchased, the location of an object point when an object is seen through the near-distance use refractive power measurement point Np is changed in comparison to that when the previously used lens is used to see. Accordingly, to enable seeing the locations of an object point just the same, it is required: to turn the user's face up and down and change the wearing angle of the lens, thereby making the locations of an object point seen through the lens coincide. As a result, immediately after a lens is replaced with a new one, the user would feel that the lens is bothersome and inconvenient until the user becomes used to the new lens.

Figure 3A:
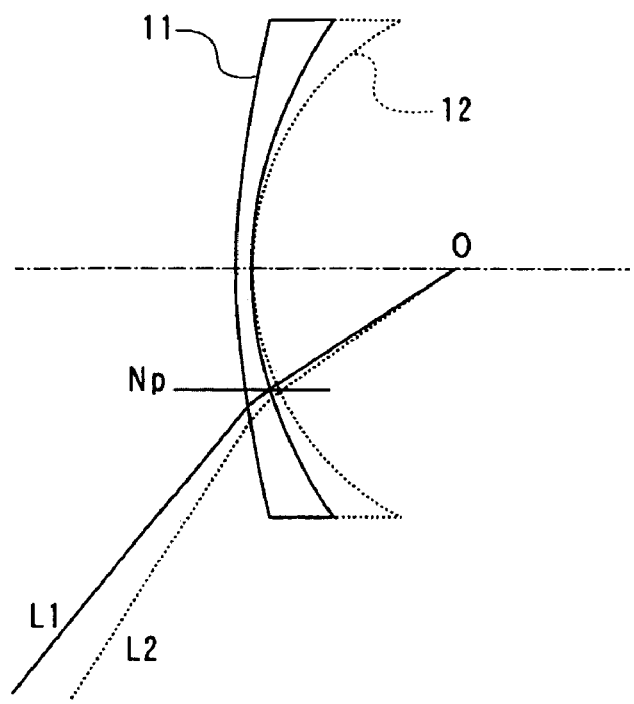
FIGS. 3A and 3B are views showing the difference in sight line owing to the refractive power of a concave lens. Specifically.
Figure 3B:
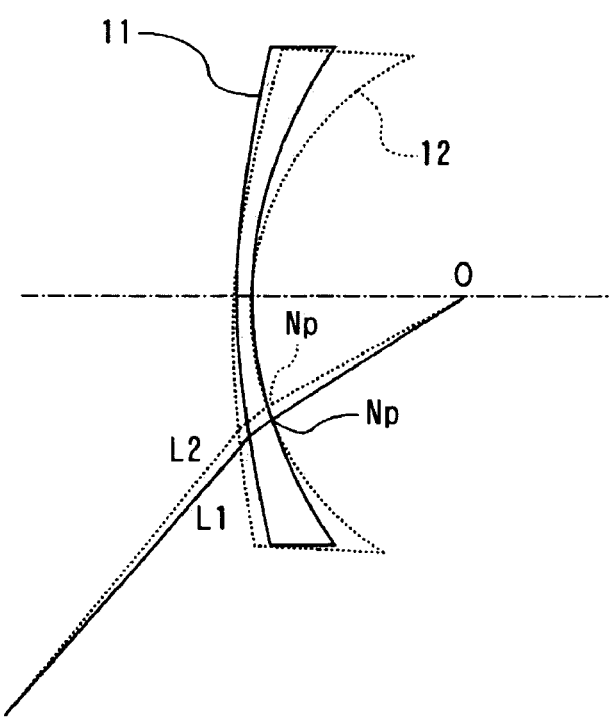

In general, when the second refractive section (near-distance use section) of a lens has a mathematically smaller refractive power, namely when the lens has a negatively larger refractive power of the near-distance use section, the prism of the direction of 270 degrees with respect to the base for the near-distance use section is made larger. FIG. 3A shows conditions of refraction of two minus-refractive power lenses differing in refractive power. The lens 12 illustrated by a broken line has a negatively larger refractive power in comparison to that of the lens 11 shown by a solid line. Therefore, in regard to the prism of the direction of 270 degrees at the near-distance use refractive power measurement point Np, the lens 12 is larger than the lens 12, and thus the light L2 passing through the lens 12 shown by a broken line is further refracted downward in comparison to the light L1 passing through the lens 11 shown by a solid line. In the case of seeing an object located at the same place with the lenses 11 and 12, it is required to lift the whole lens 12 thereby to make locations of the lights coincide as shown in FIG. 3B. To do so, a user of the lens 12 has to jut out his or her chin and raise his or her face.

Figure 4A:
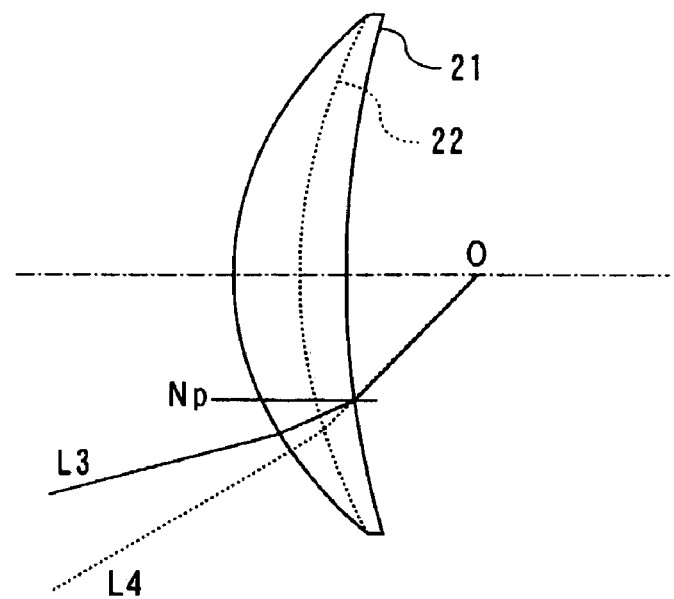
FIGS. 4A and 4B are views showing the difference in sight line owing to the refractive power of a convex lens. Specifically.
Figure 4B:
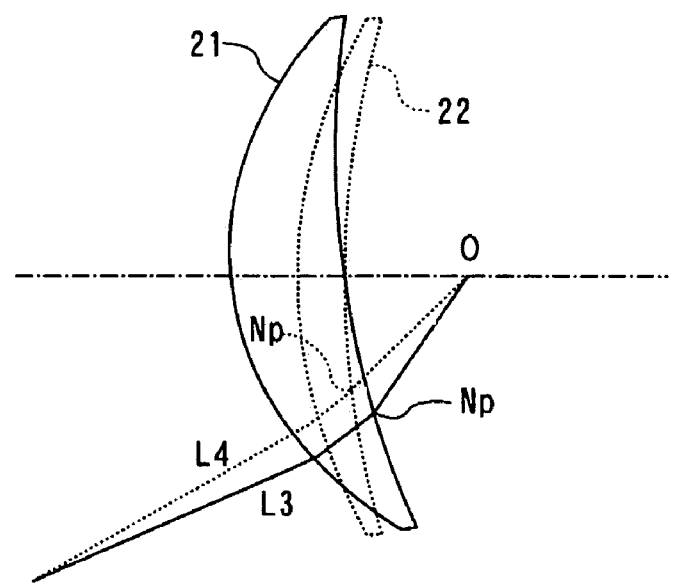

In the case of a plus-refractive power lens, the lens 22 having a smaller refractive power, namely the lens 22 having a negatively larger refractive power shown by a broken line provides a smaller prism of the direction of 90 degrees with respect to the base at the near-distance use refractive power measurement point Np, as shown in FIG. 4A. The light L4 passing through the lens 22 shown by a broken line is further refracted downward in comparison to the light L3 passing through the lens 21 shown by a solid line. On this account, a user of the lens 21 has to draw in his or her chin and set his or her face downward to see an object when the user wears the lens 22, as shown in FIG. 4B.

The above matters are disadvantages caused when the locations of the near-distance use refractive power measurement points Np of the second refractive section of the lenses coincide, namely when the progressive zone length is fixed, while the lenses differ in refractive power. In the method of designing a group of progressive power lenses in association with the invention, the relative locations of the near-distance use refractive power measurement points Np of the second refractive sections of progressive power lenses that constitute a lens group are changed according to the refractive powers of the second refractive sections of the lenses to make the prism refractive powers at the measurement points Np constant, whereby the wearing feeling of the lens can be suppressed to a level such that there is completely no difference between the positions of a user even when the user selects any lens among the lenses in the same lens group to see an object or a level such that even when there is a small difference, the user does not feel any sense of discomfort. In other words, in the case where the second refractive section has a negatively larger refractive power, the prism of the direction of 270 degrees with respect to the base can be reduced by shifting the location of the near-distance use refractive power measurement point Np of the second refractive section toward a central portion of the lens. As a result, the sight line of the resultant lens can be made closer to that of a lens having a positively larger refractive power and as such, the difference in wearing feeling can be reduced. As for the method of designing a group of progressive power lenses in association with the invention, the progressive zone length is eliminated because it is devised based on the intention of standardizing the concept.

The prism refractive power at the near-distance use refractive power measurement point Np of the second refractive section changes depending on the refractive power of the first refractive section and the addition. To make constant the prism refractive power at the near-distance use refractive power measurement point Np of the second refractive section even when any lens of a progressive power lens group is selected, in the case where the addition is constant, the lenses of the progressive power lens group are designed so that the progressive zone length of the lens having a negatively larger refractive power of the first refractive section is made shorter. However, because it is difficult to actually measure the progressive zone length of an actual lens, the progressive zone length shall be herein simply expressed with the fitting point and the near-distance use refractive power measurement point of the second refractive section shown by an addition's reference circle, and more preferably their distances in the vertical direction relative to the upper end. The simply expressed progressive zone length is based of the assumption in which an addition-measured point and an upper end of the second refractive section are fixed. Of course, it is preferable to use an actually measured value when it is possible to actually measure the progressive zone length, i.e. the distance in the vertical direction on a major meridian between: the location of transition from a region where the refractive power of the first refractive section is substantially constant to a region where the refractive power changes; and the transitional location from the refractive power changing region to a near-distance use region with the refractive power substantially fixed between the progressive section and the second refractive section.

Further, as for the progressive power lenses belonging to a progressive power lens group identical in the refractive power of the first refractive section, the lenses of the progressive power lens group are designed so that the progressive zone length of the lens having a larger addition is made longer. This is because when the refractive power of the first refractive section is constant, the refractive power of the second refractive section shifts to the plus side with an increase in the addition and therefore the prism refractive power is made smaller.

In addition, when the refractive power of the second refractive section is constant, the lenses belonging to a progressive power lens group are designed so that the progressive zone length of the lens having a larger addition is made shorter. This is because the refractive power of the second refractive section is unvaried and the refractive power of the first refractive section is made to further lean to the minus side with an increase in the addition.

Incidentally, the above-described progressive zone length is a relative value obtained when the lenses of a progressive power lens group are compared. When the design concept of the lens is altered, the absolute value of the progressive zone length is changed. Also, in the case where the lens material has a different refractive index, the prism refractive power is changed even when the refractive power is the same and as such, the absolute value of the progressive zone length is changed.

In regard to a progressive power lens, it has been well known that shortening the progressive zone length increases the distortion and vibration of an image, which are felt when spectacles are worn. Therefore, people would think that an inconvenience in design results from using a lens having a negatively larger refractive power and shifting the near-distance use refractive power measurement point Np to a center portion of the lens thereby to shorten the progressive zone length. However, it has been seen from the research by the inventor that a person wearing a minus-refractive power lens is less sensitive to the distortion and vibration of an image in comparison to a person using a plus-refractive power lens in general. The reason for this can be considered as follows: an image through a minus-refractive power lens seems to be smaller and the distortion and vibration of an image is hard to feel. Therefore, even when the progressive zone length of a lens having a minus refractive power is shortened, a wearing uncomfortable feeling owing to the distortion and vibration of an image does not matter. Reversely, as for a plus-refractive power lens that is easy to feel the distortion and vibration, the progressive zone length can be made longer and the distortion of the lens can be reduced. Therefore, the method of designing a group of progressive power lenses in association with the invention can not only improve the wearing posture but also reduce the sense of discomfort during wearing.

Figure 1A:
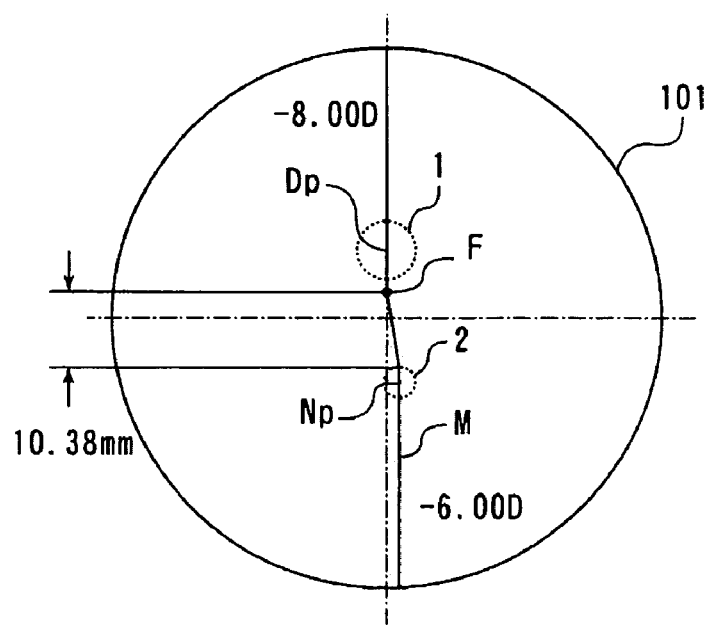
FIGS. 1A and 1B are plan views each showing an example of a lens designed according to a method of designing a group of progressive power lenses in association with the invention.
Figure 1B:
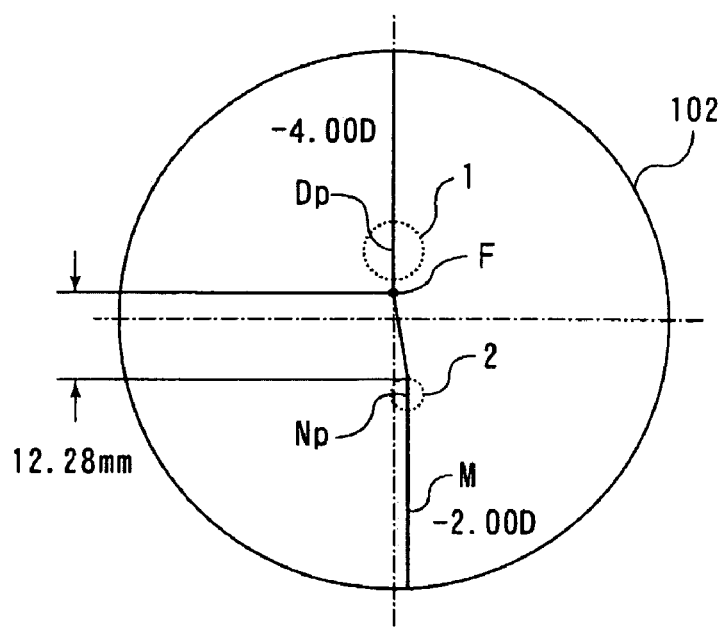

Now, FIGS. 1A and 1B show design examples of two progressive power lenses having different refractive powers belonging to a progressive power lens group standardized under the design concept of the dispersed-aberration type and an internal progressive power lens having a progressive refraction face provided on a refractive surface on the side of eyeball, a so-called far-and-near distance type progressive power lens, in which the refractive index of the lens material is 1.67.

Of the drawings, FIG. 1A shows a progressive power lens 101 having a spherical refractive power S of −8.00 dioptres (hereinafter stated as D) and an addition ADD of 2.00 D. FIG. 1B shows a progressive power lens 102 having a spherical refractive power S of −4.00 D and an addition ADD of 2.00 D. In each of the drawings, a far-distance use refractive power reference circle 1, a fitting point F, a near-distance use refractive power reference circle (addition-measuring range) 2, a near-distance use refractive power measurement point Np, and a major meridian M are shown. The major meridian M is displaced toward the nose side below the fitting point F accommodating convergence of eyes. Also, the distance between the fitting point F and the upper end of the near-distance use refractive power reference circle 2 shows the progressive zone length. As for the refractive power of the near-distance use section, S is −6.00 D for the lens 101, and S is −2.00 D for the lens 102. The both lenses have an addition of 2.00 D, whereas the progressive zone length of the lens 101 having a far-distance use section with a negatively larger refractive power is 10.38 mm, and the progressive zone length of the lens 102 having a far-distance use section with a positively larger refractive power is 12.28 mm. In the case where the additions are identical, the progressive zone length of the lens 101, which has a negatively larger (smaller) refractive power of the far-distance use section, is shorter. Also, it is possible to change the amount of biasing the near-distance use section toward the center of the lens according to the refractive power of a lens. However, the amount of biasing is fixed at 2.5 mm in the embodiment for the sake of clarity of the description.

Table 1 shows examples when the distance between the fitting point F and the upper end of a near-distance use reference circle (a refractive power measurement point of the second refractive section) 2 in a vertical direction is displayed as a size of the progressive zone length, in which the refractive power of the first refractive section and the addition of a lens belonging to a group of progressive power lenses having a refractive index of the same lens material as that of the lenses shown in FIGS. 1A and 1B and standardized under the same design concept are used as parameters.

TABLE 1

| FAR-DISTANCE USE REFRACTIVE POWER S(D) | ADDITION POWER ADD (D) | | |
|---|---|---|---|
| | 1.00 | 2.00 | 3.00 |
| +6.00 | 16.78 | 17.06 | 17.34 |
| +5.00 | 16.30 | 16.58 | 16.86 |
| +4.00 | 15.82 | 16.10 | 16.38 |
| +3.00 | 15.34 | 15.62 | 15.90 |
| +2.00 | 14.86 | 15.14 | 15.42 |
| +1.00 | 14.38 | 14.66 | 14.94 |
| +0.00 | 13.91 | 14.18 | 14.46 |
| −1.00 | 13.43 | 13.71 | 13.98 |
| −2.00 | 12.95 | 13.23 | 13.51 |
| −3.00 | 12.48 | 12.75 | 13.03 |
| −4.00 | 11.99 | 12.28 | 12.55 |
| −5.00 | 11.50 | 11.79 | 12.08 |
| −6.00 | 11.00 | 11.30 | 11.59 |
| −7.00 | 10.58 | 10.80 | 11.10 |
| −8.00 | 10.07 | 10.38 | 10.60 |

The refractive power of the first refractive section and the addition shown in Table 1 are set at intervals of 1 D, but the data are completely the same even when they are set at smaller intervals, e.g. at intervals of 0.5 D.

In the case where the additions are identical, the progressive zone length is shortened as the far-distance use section refractive power is made negatively larger (smaller refractive power). Further, in the case where the far-distance use section refractive powers are identical, the progressive zone length is made longer as the addition is made larger. Still further, in the case of lenses having the same near-distance use refractive power, the larger the addition is, the shorter the progressive zone length is. For example, a lens with a far-distance use section refractive power S of +1.00 D and an addition ADD of 1.00 D has a near-distance use refractive power S of +2.00 D, which is the same as the near-distance use refractive power of a lens with a far-distance use section refractive power S of 0.00 D and an addition ADD of 2.00 D. The progressive zone length of the former lens is 14.38 mm, and that of the latter lens larger in addition is 14.18 mm. In the case where the near-distance use refractive powers are identical, the progressive zone length is shortened with an increase in addition.

In the above description, the design of a progressive power lens group, to which no astigmatism-correcting property is imparted, has been stated. However, the astigmatism refractive power in addition to the spherical refractive power in often incident to typical lenses for spectacles. In the case of a lens for astigmatism, the prism effect of the near-distance use section is changed depending on the direction of an astigmatism axis. Therefore, an astigmatism-correcting property is imparted to a refractive surface on the eyeball side or object side. In the case where the astigmatism refractive power is not zero at a measurement location to measure the refractive power of the first refractive section, in the far-distance use section refractive power resulting from the combination of the spherical refractive power and the astigmatism refractive power, a progressive power lens group can be designed by regarding, as a far-distance use refractive power, a refractive power component along the direction of the progressive zone, namely the refractive power in a direction from the fitting point F toward the upper end of the addition's reference circle 2. Specifically, as for progressive power lenses identical in addition and first refractive section refractive power, they are designed so that the progressive power lens having a smaller vertical direction component of the astigmatism refractive power of the first refractive section refractive power is shorter in the distance in the vertical direction between the fitting point and a addition-measuring range to measure the second refractive section.

Figure 5A:
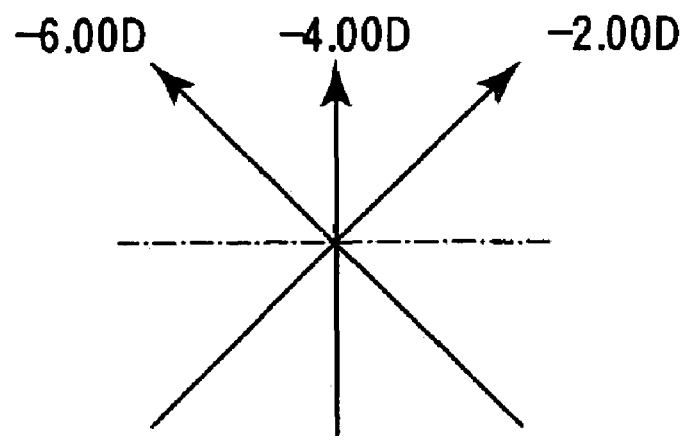
FIGS. 5A and 5B are conceptual drawings each showing vertical direction components of a refractive power in the case of astigmatism.
Figure 5B:
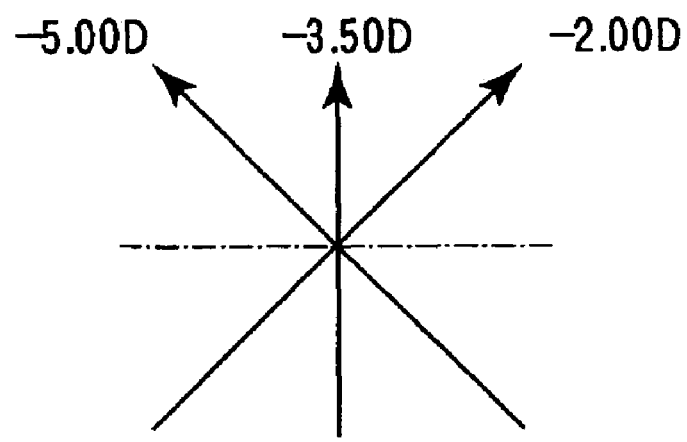

For example, as shown in FIGS. 5A and 5B, assuming the case where the astigmatism axis is a meridian forming an angle of 45 degrees from a base point on the right side in a horizontal direction when a test, subject is seen in the face, the astigmatism refractive power of the lens shown in FIG. 5A is as follows: the refractive power in the direction of the astigmatism axis is −2.00 D, the refractive power in the direction of a meridian orthogonal to the astigmatism axis is −6.00 D, and the component in the vertical direction is −4.00 D. On the other hand, the astigmatism axis of a lens shown in FIG. 5B is in the direction of a meridian of 45 degrees likewise. In this case, the refractive power in the direction of the astigmatism axis is −2.00 D, a refractive power in the direction of the meridian orthogonal to the astigmatism axis is −5.00 D, and the refractive power component in the vertical direction is −3.50 D. The refractive power component in the vertical direction of the astigmatism of the lens shown in FIG. 5A is smaller than that of the astigmatism of the lens shown in FIG. 5B. In other words, the lens shown in FIG. 5A has a negatively larger refractive power and as such, the lens shown in FIG. 5A is larger than the lens shown in FIG. 5B in the prism refractive power at the near-distance use section's measurement location Np, and therefore it is needed to dispose the upper end of the near-distance use section at a higher level thereby to shorten the progressive zone length.

For example, it is actually difficult to design a group of progressive power lenses with the first refractive section refractive powers and additions set at small intervals of 0.1 D. Therefore, the measure of making the progressive zone length constant within a range of e.g. 0.1 to 0.5 D is taken. However, in designing a progressive power lens group, the tendency of increasing or decreasing the progressive zone length depending on the above-described near-distance use section refractive power, i.e. the prism refractive power is still unchanged.

In addition, for the purpose of reducing the manufacturing cost, it is considerable that the progressive zone length is commonly used within a certain refractive power range (e.g. a range of S=−5.00 to S=−8.00 D). Also, it can be considered that this case is included within the scope of the invention as long as the lens having a near-distance use section with a relatively negatively-larger refractive power is set so that its progressive zone length is made shorter when the whole refractive power range is surveyed.

In the above description, to show the progressive zone length simply, the distance in the vertical direction between the fitting point and the near-distance use refractive power measurement point of the second refractive section is defined as the progressive zone length, and it is stated that its predetermined location is preferably the upper end of the addition-measuring range. However, because the progressive zone length of each progressive power lens is a relative value, the predetermined location of the addition-measuring range may be, for example, the near-distance use refractive power measurement point Np, of course.

The method of designing a group of progressive power lenses in association with the invention is a designing method such that even when any lens of the group of progressive power lenses, which is a set of progressive power lenses standardized under the same design concept, is selected, a user can see an object with the same posture as that of the previous lens. The method of designing a group of progressive power lenses can be utilized as a method of designing a lens intended to cover an insufficiency of ability of accommodation owing to presbyopia well.

What is claimed is:

1. A method of designing a progressive power lens group as a set of progressive power lenses, each having a first refractive section having a refractive power for seeing an object located at a predetermined distance, a second refractive section having a refractive power for seeing an object located at a near distance, and a progressive section with its refractive power progressively changing from the first refractive section to the second refractive section, the progressive power lens group satisfying: a condition where the first refractive sections differing in refractive power can be selected; a condition where at least two additions can be selected for the first refractive section having an identical refractive power; a condition where refractive indexes of materials of the progressive power lenses are identical; and a condition where design concepts of the progressive power lenses are standardized, the method comprising:

designing the progressive power lenses so that for the progressive power lenses identical in addition, the smaller the refractive power of the first refractive section is, the shorter a distance in a vertical direction between a fitting point and a refractive power measurement point of the second refractive section is, and for the progressive power lenses identical in the refractive power of the first refractive section, the larger the addition is, the longer the direction in the vertical direction between the fitting point and the refractive power measurement point of the second refractive section is.

2. The method of designing a progressive power lens group of claim 1, further comprising designing the progressive power lenses when an astigmatism refractive power at a refractive power measurement point of the first refractive section is not zero so that for the progressive power lenses identical in the addition and the refractive power of the first refractive section, the progressive power lens smaller in a vertical direction component of the astigmatism refractive power of the refractive power of the first refractive section has a shorter distance in the vertical direction between the fitting point and the refractive power measurement point of the second refractive section.

3. The method of designing a progressive power lens group of claim 1, wherein the distance in the vertical direction between the fitting point and the refractive power measurement point of the second refractive section is a distance in the vertical direction on a major meridian between a location of transition from a region where the refractive power of the first refractive section is substantially constant to a region where the refractive power changes and a transitional location from the refractive power changing region to a near-distance use region with the refractive power substantially fixed between the progressive section and the second refractive section.

* * * * *